United States Patent Office 3,275,474
Patented Sept. 27, 1966

3,275,474
OXYGEN POWER ELECTRODES
René Buvet, Cachan, France, assignor to Electricite de France-Service National, Paris, France, a national French organization
No Drawing. Filed Sept. 5, 1961, Ser. No. 135,794
Claims priority, application France, Mar. 9, 1961, 855,101, Patent 1,291,005
2 Claims. (Cl. 136—86)

In certain devices in which an electrolytic oxidation-reduction takes place, it is necessary to bring the gaseous oxygen into simultaneous contact with the electrode on the one hand, and with the electrolyte on the other hand. This continuous introduction of gaseous oxygen in simultaneous contact with the solid phase (electrode) and the liquid phase (electrolyte) has two substantial drawbacks:

The difficulty of industrial application of the device on the one hand;

The instability of the gas-liquid separation surface on the other hand.

The present invention has for its object a process which provides a means of overcoming, in a simple and effective manner, the two drawbacks referred-to above.

Seen from a first aspect, this process consists mainly in bringing oxygen into contact with the electrode in the form of a solution of this gas in the electrolyte.

Seen from another aspect, the invention therefore consists in previously dissolving pure or diluted oxygen in the electrolyte employed, and in subsequently injecting this electrolyte in forced or natural circulation either in contact with or through a suitably designed electrode.

In the present process, it is possible to employ pure or diluted oxygen, either in the molecular form ($O^2$) or in the form of ozone ($O^3$). The electrolyte employed can be an aqueous solution or a solution in any other liquid which is a conductor of ions and there can be incorporated with the electrolyte any substances which are suitable for increasing the true solubility of the oxygen; there can similarly be employed any arrangements which are likely to increase the quantity of oxygen dissolved: for example, the operation can be carried out at any desired pressure which is higher than atmospheric pressure, by application of the fact that the solubility of oxygen increases as a direct function of pressure.

In order to permit the oxidation-reduction reaction to take place effectively over a substantial thickness of the electrode, it is necessary:

To reduce the resistivity of the electrolyte by dissolving in this latter ionizable substances which are not necessarily employed in the electro-chemical reactions which are contemplated. Very soluble alkaline salts could, for example, be employed;

To make the electrode of a porous electron-conductive material having a porosity preferably greater than 50% and to determine the structure of the electrode so as to reduce to a minimum the resistance factor of the electrolyte in which the said electrode is immersed.

For the practical operation of this process, it is preferable to use an electrode having an active surface which is as large as possible, by reducing for example the diameter of the pores at constant porosity.

By way of example only, and without thereby constituting any possible limitation of the present invention, an electrode is produced which is particularly suitable for the practical operation of the present process by juxtaposing unitary tubes of a metal such as silver, these tubes having a diameter of the order of 0.1 to 0.5 mm. and a small thickness of wall, while the length of the said tubes can be, for example, of the order of one centimeter.

Also by way of example, the electrolyte to be employed can be constituted with an electrode of this kind by an aqueous solution of potassium hydroxide saturated with potassium nitrate and oxygen which is present in the form of air. This solution is injected through a plate constituted by juxtaposed tubes such as the tube described above. The frontal current density obtained prior to reduction of the water reaches 50 milliamperes per square centimeter, at normal temperature and at normal pressure.

It will naturally be understood that it would not constitute any departure from the scope of the present invention to make modifications in the example described above, within the spirit of the definitions given in the present specification.

The present invention meets with various applications, in particular in the field of gas-batteries, batteries and accumulators of the solid reducing-agent type, and finally in the synthesis of electro-chemical oxidation.

What I claim is:
1. A method of operating an electrolyte oxidation-reduction device to increase the density of the current produced by the device comprising:
   treating an electrolytic solution prior to injection into said device to increase the solubility of oxygen there therein over normal solubility by dissolving oxygen under pressure in the electrolyte, forming an oxygen-enriched liquid electrolyte solution free of oxygen bubbles; and
   injecting said enriched solution into said device and in continuous circulation through a catalytic electrode having a porosity of greater than 50 percent so that an oxidation-reduction reaction of increased efficiency takes place over a substantial thickness of the said electrode.

2. A method of operating an electrolytic oxidation-reduction device which comprises:
   dissolving potassium nitrate in a solution of potassium hydroxide to form a liquid electrolyte solution saturated with potassium nitrate;
   dissolving oxygen in said electrolyte solution so that said electrolyte solution is oxygen enriched but is free of oxygen bubbles;
   and injecting said solution through an electrode having a porosity of greater than 50 per cent so that the oxidation-reduction reaction takes place over a substantial thickness of the electrode.

References Cited by the Examiner
UNITED STATES PATENTS

| | | | |
|---|---|---|---|
| 142,502 | 9/1873 | Nolf | 136—86.2 |
| 567,721 | 9/1896 | Payson | 136—86 |
| 681,660 | 8/1901 | Spahr | 136—86.2 |
| 963,852 | 7/1910 | Benko | 136—86.2 |
| 2,114,234 | 4/1938 | Ornstein et al. | 204—195 |
| 2,384,463 | 9/1945 | Gunn et al. | 136—86 |
| 2,921,110 | 1/1960 | Crowley et al. | 136—86 |
| 2,925,454 | 2/1960 | Justi et al. | 136—86 |
| 3,022,241 | 2/1962 | Jessop | 204—195 |

FOREIGN PATENTS

| | | |
|---|---|---|
| 12,171 | 6/1899 | Great Britain. |
| 15,727 | 7/1906 | Great Britain. |
| 1,265,399 | 5/1961 | France. |

OTHER REFERENCES
Benjamin, The Voltaic Cell, 1st Edition, 1893, pp. 106 and 107.

WINSTON A. DOUGLAS, Primary Examiner.

JOHN R. SPECK, JOHN H. MACK, H. FEELEY,
Assistant Examiners.